US008862167B2

(12) United States Patent  
Sasayama et al.

(10) Patent No.: US 8,862,167 B2  
(45) Date of Patent: Oct. 14, 2014

(54) RADIO BASE STATION, RADIO COMMUNICATION SYSTEM AND INTERFERENCE NOTIFYING METHOD IN RADIO COMMUNICATION SYSTEM

(75) Inventors: Tsukasa Sasayama, Yokohama (JP);  
Mikio Kuwahara, Yokohama (JP);  
Koichiro Furueda, Yokohama (JP);  
Hajime Kanzaki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 592 days.

(21) Appl. No.: 13/238,556

(22) Filed: Sep. 21, 2011

(65) Prior Publication Data

US 2012/0094703 A1    Apr. 19, 2012

(30) Foreign Application Priority Data

Oct. 15, 2010    (JP) .................................. 2010-232086

(51) Int. Cl.  
*H04B 15/00*    (2006.01)

(52) U.S. Cl.  
USPC ...... 455/501; 455/507; 455/452.2; 455/432.1; 455/436; 370/242; 370/331

(58) Field of Classification Search  
USPC .............. 455/501, 507, 452.2, 422.1, 432.1, 455/436–443; 370/242, 331  
See application file for complete search history.

(56) References Cited

FOREIGN PATENT DOCUMENTS

| CN | 1897757 A | 1/2007 |
|---|---|---|
| CN | 101389125 A | 3/2009 |
| CN | 101494480 A | 7/2009 |
| CN | 101616417 A | 12/2009 |
| CN | 101697628 A | 4/2010 |

OTHER PUBLICATIONS

3GPP TS36.423 V8.9.0 8.3.1 (Load indication) Mar. 2010, pp. 16-17.  
Chinese Office Action received in Chinese Application No. 201110285040.1 dated Dec. 30, 2013.

*Primary Examiner* — Shaima Q Aminzay  
(74) *Attorney, Agent, or Firm* — Mattingly & Malur, PC

(57) ABSTRACT

A radio communication system is provided in which, based on a measurement condition and neighbor information specified by a base station to which a mobile terminal is connected, the mobile terminal measures the reception quality of the neighboring base stations included in the neighbor information and, when a transmission request is received from the connected base station, transmits the measurement result to the connected base station. In this radio communication system, the base station transmits neighbor information, which specifies the base stations for which interference measurement is to be performed, and a measurement result transmission request to the mobile terminal at a predetermined time for measuring the interference of neighboring base stations and, in response to it, the mobile terminal transmits the measurement result of the base stations, specified by the base station for measuring the interference, to the base station.

9 Claims, 16 Drawing Sheets

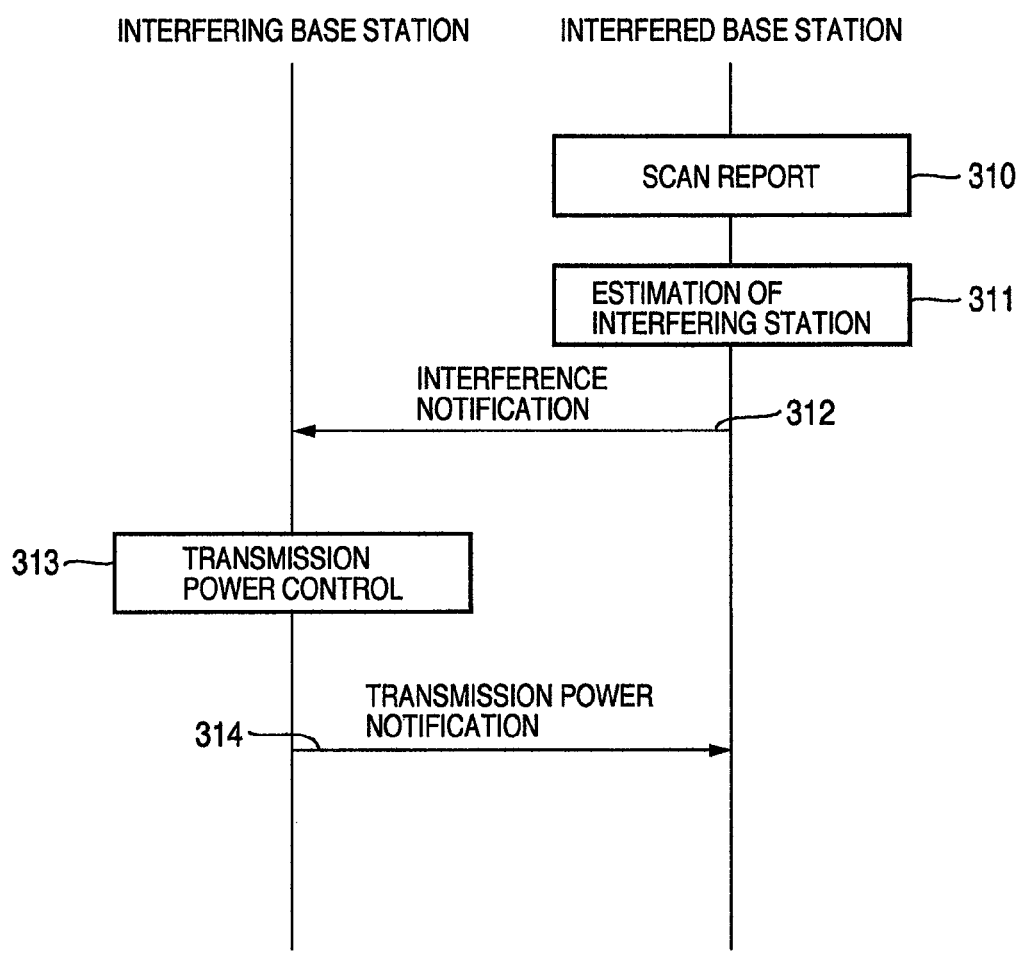

FIG.6

| | |
|---|---|
| #631 | F1 |
| #633 | F3 |
| #601 | F1 |
| #602 | F2 |
| #603 | F3 |
| #611 | F1 |
| #612 | F2 |
| #613 | F3 |
| #621 | F1 |
| #622 | F2 |
| #623 | F3 |
| #641 | F1 |
| #642 | F2 |
| #643 | F3 |
| #651 | F1 |
| #652 | F2 |
| #653 | F3 |
| #661 | F1 |
| #662 | F2 |
| #663 | F3 |

FIG.8
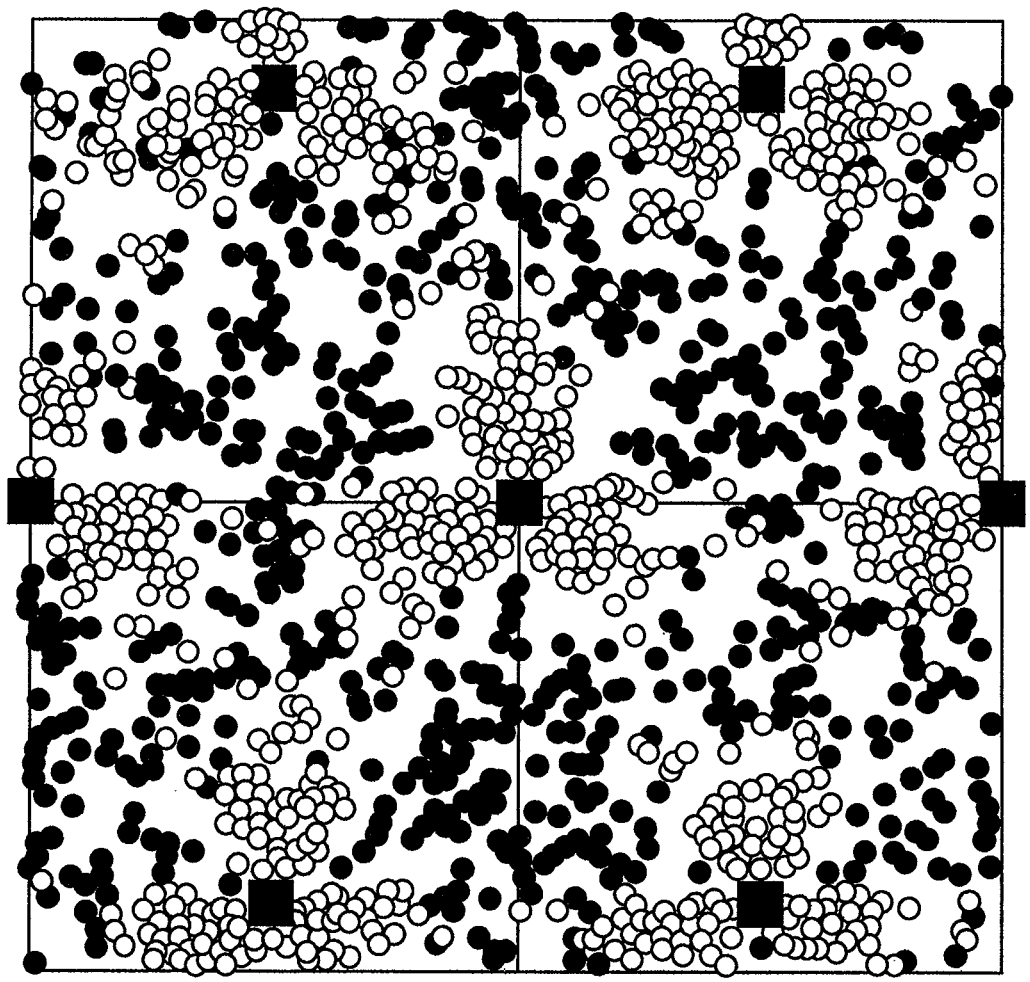
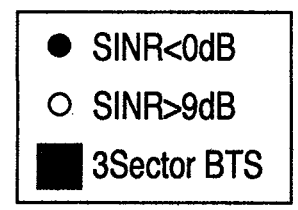

| | |
|---|---|
| #602 | F2 |
| #612 | F2 |
| #622 | F2 |
| #642 | F2 |
| #652 | F2 |
| #662 | F2 |

| #602 | F2 | -95dBm |
| #612 | F2 | -95dBm |
| #622 | F2 | -100dBm |
| #642 | F2 | -80dBm |
| #652 | F2 | -94dBm |
| #662 | F2 | -78dBm |

RADIO BASE STATION, RADIO COMMUNICATION SYSTEM AND INTERFERENCE NOTIFYING METHOD IN RADIO COMMUNICATION SYSTEM

INCORPORATION BY REFERENCE

The present application claims priority from Japanese application JP2010-232086 filed on Oct. 15, 2010, the content of which is hereby incorporated by reference into this application.

BACKGROUND OF THE INVENTION

The present invention relates to a radio communication technology, and more particularly to a technology for reducing interference among base stations in a cellular radio communication system.

In a cellular radio communication system, multiple base stations or antennas are geographically dispersed and a radio communication service area is formed in a range in which the radio waves from the base stations and the antennas are received. A mobile terminal, which is capable of receiving signals from multiple base stations and antennas, is controlled so that the mobile terminal is connected to the base station from which the highest-quality signal is received. A radio communication system provides a mechanism, called a handover, via which a terminal switches the base station, to which it is connected, from one base station to another as the terminal moves, allowing the terminal to maintain the radio communication even when it is moving. To assure the connectivity of a terminal while it is moving, the boundaries of the service areas formed by the base stations and antennas overlap. The signal transmitted from each base station or each antenna, though significant information to a terminal connected to the base station and the antenna, is interference to the communication of a terminal connected to another base station or antenna. Such interference becomes an obstruction to an interfered terminal and results in a reduction in communication quality or throughput.

One known method for reducing interference among base stations is Fractional Frequency Reuse (FFR). This technology provides a mechanism in which multiple base stations and antennas put weight on the transmission power of frequency resources or select frequency resources to allow the usable frequency resources to be shared to prevent the generation of interference.

The technology FFR is based on the premise that mobile terminals are uniformly distributed. Actually, however, the distribution of mobile terminals depends on the factors such as commercial activities with the tendency that the density is high in a specific area. For example, the population density is very high at a major terminal station, but not in the area surrounding the major terminal station. As a result, there is a large difference between the number of terminals in communication with the base station covering a major terminal station and the number of terminals in communication with the base station covering an area surrounding the terminal station. Because of this, FFR that is based on the premise that the distribution of mobile terminals is uniform sometimes does not improve interference.

To achieve fairness for each mobile terminal when the distribution of mobile terminals is very uneven, it is desirable that the base stations surrounding a major terminal station limit the use of a part of frequency resources and that the reduction in interference in the limited frequency be declared to the surrounding base stations. In a part of radio communication systems using a new standard (for example, 3GPP TS36.423 V8.9.0 8.3.1 (Load Indication), hereinafter called Document 1), the interface for transmitting and receiving the information on the interference control among base stations is installed. This mechanism is called Inter Cell Interference Coordination (ICIC). In a radio communication system in which ICIC is installed, the resource state and the interference state must be reported among the base stations. FFR in which ICIC is installed is called Dynamic FFR (DFFR).

SUMMARY OF THE INVENTION

As one method for reporting the resource state and the interference state among the base stations in DFFR described above, a base station that is affected by interference (hereinafter called an interfered station) notifies information, which indicates that the station is affected by interference, to a base station that causes interference (hereinafter called an interfering station). Based on the scan report operation performed by a mobile terminal, the interfered station estimates an interfering station and notifies the information to the interfering station to indicate that the interfered station is affected by interference. The scan report operation is an operation in which a measurement condition for scanning is supplied in advance from a base station to a mobile terminal and, when the measurement condition is satisfied, the mobile terminal measures the signal quality of the received signal from surrounding base stations and reports the measurement result to the base station as necessary.

The surrounding base stations for which a mobile terminal is to measure the signal quality at scan time are specified by the neighbor information reported by the base station. Because the scan report operation is performed usually for a handover, the neighbor information reported by the base station includes a base station not necessary for estimating an interfering station. Therefore, to estimate an interfering station via the scan report operation, it is necessary to limit the base stations on which the mobile terminal is to report or to set conditions for the mobile terminal to report the scan result to the base station. Otherwise, various terminals would frequently transmit reports on base stations that are not necessary for estimating an interfering station. This frequent transmission of unnecessary information results in the wasteful consumption of uplink frequency resources.

To solve the problems described above, it is an object of the present invention to allow a mobile terminal, which is used to measure interference, to appropriately select a neighboring base station that generates strong interference, to prevent the mobile terminal form reporting the measuring result of a base station not necessary for interference measurement, and to prevent scan result reports from being generated frequently.

To solve the above problems, the present invention provides a radio communication system comprising a plurality of mobile terminals; and a plurality of base stations each of which communicates wirelessly with the plurality of mobile terminals, with each of the plurality of base stations connected to a core-side device via a wired line. The plurality of base stations are capable of communicating with each other via the wired line and, based on a measurement condition and neighbor information specified by a base station to which each of the mobile terminals is connected, the mobile terminal measures the reception quality of neighboring base stations included in the neighbor information. If a transmission request is received from the base station to which the mobile terminal is connected, the mobile terminal transmits a measurement result to the base station to which the mobile terminal is connected. When the base station determines that it is a time to measure interference from neighboring base stations, the base station transmits neighbor information, specifying neighboring base stations for which interference measurement is to be performed, and a measurement result transmission request in response to a measurement requests transmitted from the mobile terminal, and the mobile terminal transmits the reception quality measurement result of the neighboring base stations, which are specified by the base station and for which interference measurement is to be performed, to the base station.

The base station creates the neighbor information with priority on the neighboring base stations for which interference measurement is to be performed, and the mobile terminal transmits the reception quality measurement result on high-priority neighboring base stations to the base station.

Based on the reception quality measurement result of the neighboring base stations received from the mobile terminal, the base station estimates an interfering neighboring base station and transmits an interference notification to the neighboring base station via the wired line.

When interference is measured using a terminal, the present invention makes it possible to appropriately select a neighboring base station, which causes strong interference, and prevents the measurement result of the base stations, for which interference measurement is not required, from being reported. In addition, the present invention prevents the scan result from being reported frequently. As a result, the present invention reduces the wasteful consumption of frequency resources when a scan result is reported from a mobile terminal.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of the sequence between an interfering station and an interfered station.

FIG. 6 is a diagram showing an example of neighbor information in one embodiment of the present invention.

FIG. 8 is a diagram showing the simulation result of the CINR distribution.

DETAILED DESCRIPTION OF THE EMBODIMENTS

Embodiments of the present invention will be described with reference to the drawings.

[First Embodiment]

Figure 1:
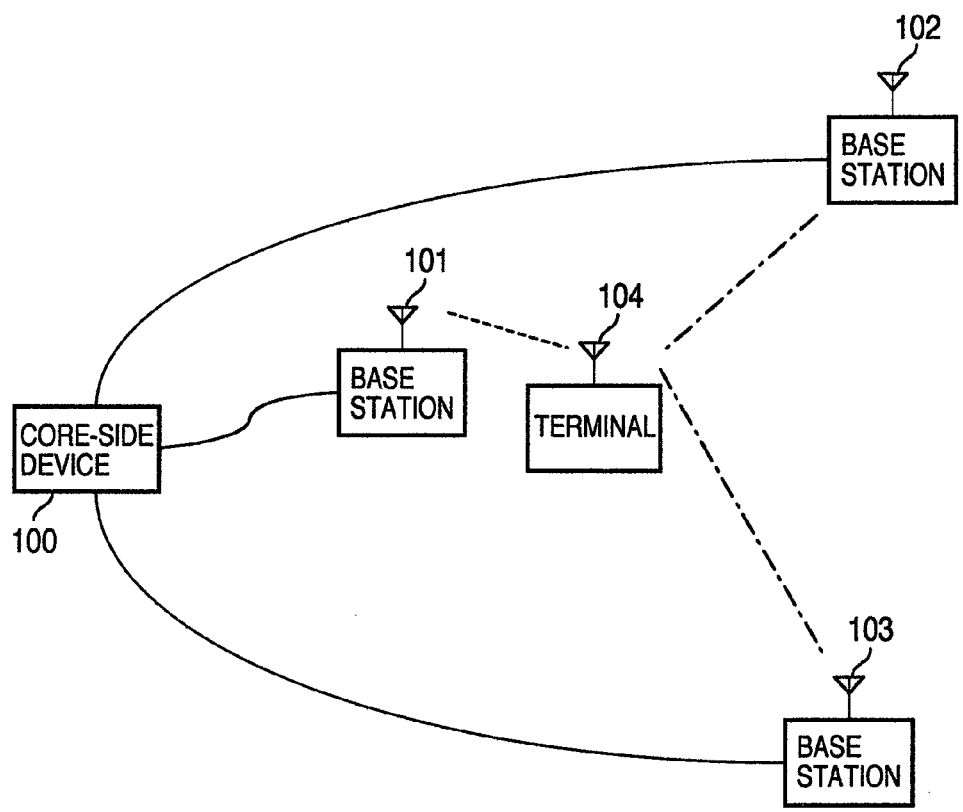
FIG. 1 is a diagram showing an example of the configuration of a radio communication system.

FIG. 1 is a diagram showing an example of the configuration of a radio communication system.

Base stations 101-103 are connected to the core network for data communication with a core-side device 100. The base station 101 converts information, obtained from the core-side device 100, to the high-frequency signal and transmits it to a terminal 104 via a radio signal. The terminal 104 receives the radio signal and performs the signal processing to convert the radio signal to information for carrying out communication with the core-side device 100. On the other hand, information generated by the terminal 104 is converted to the high-frequency signal by the terminal 104 and is transmitted to the base station 101 via a radio signal. The radio signal transmitted by the terminal 104 and received by the base station 101 is converted to information by the signal processing and is transmitted to the core-side device 100.

In the example shown in FIG. 1, multiple base stations 101-103 are connected to the core-side device 100. The base stations 101-103, which are dispersed geographically, transmit signals at different locations. When the terminal 104 receive a signal transmitted by a base station other than the base station 101, the signal transmitted by a base station other than the base station 101 is received by the terminal 104 as an interference wave.

As one method for reducing interference among base stations, FFR is known as described above. FFR in which ICIC is installed is called DFFR wherein ICIC is a mechanism for transmitting and receiving information between base stations for interference control.

Figure 2A:
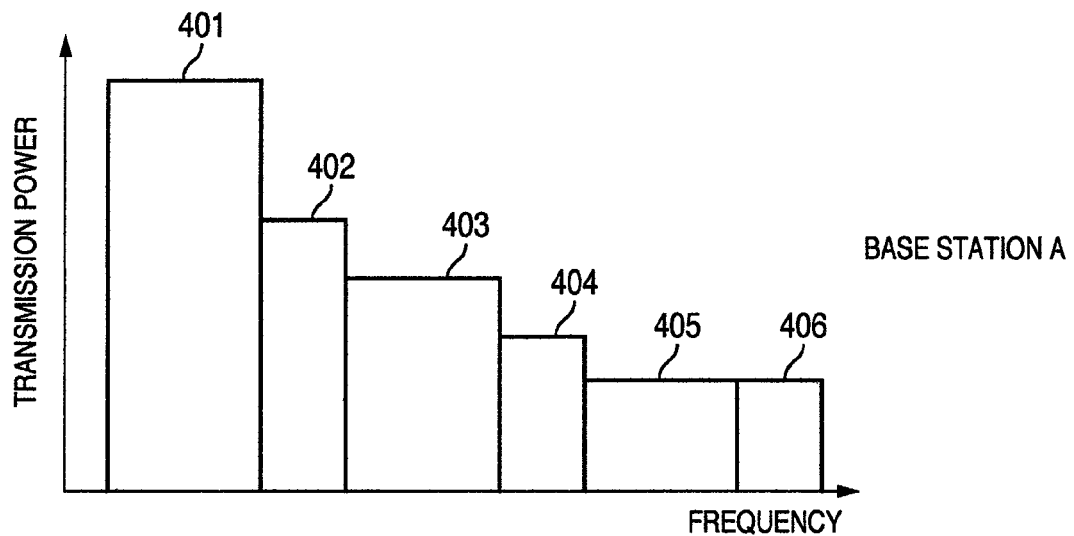
FIGS. 2A and 2B are diagrams showing the transmission power values of the frequency resources of two neighboring base stations.
Figure 2B:
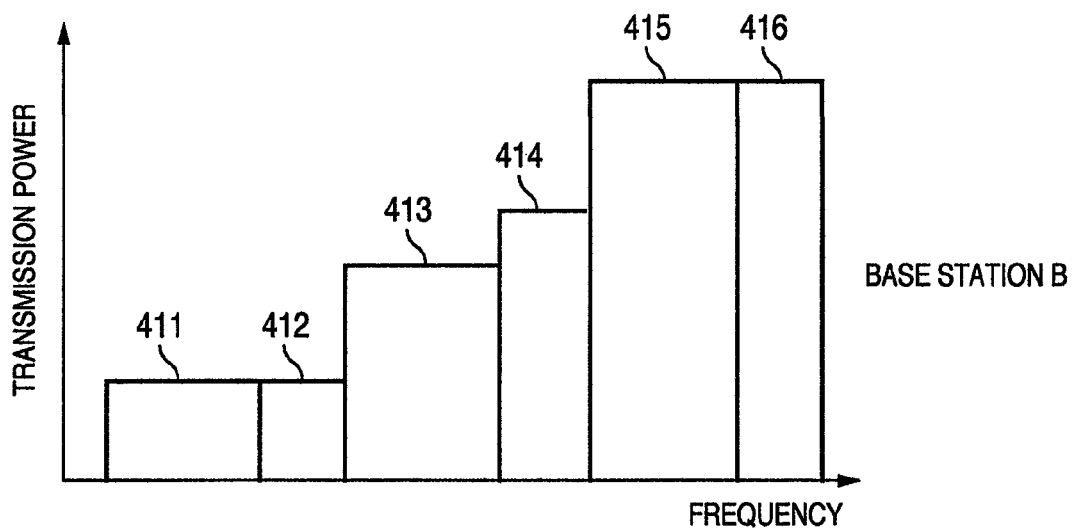

FIGS. 2A and 2B are diagrams showing the transmission power values of the frequency resources of the two neighboring base stations.

The following describes DFFR with reference to FIGS. 2A and 2B.

FIGS. 2A and 2B show an example of the frequency resource state in the base stations to which DFFR is applied.

In FIGS. 2A and 2B, base station A and base station B are adjacent. In FIGS. 2A and 2B, the vertical axis indicates the transmission power and the horizontal axis indicates the frequency. In this embodiment, Worldwide Interoperability for Microwave Access (WiMAX) IEEE802.16e is used as an example. In WiMAX, when the system band is, for example, 10 MHz, the 10 MHz frequency band is divided into six major groups (401-406 or 411-416) as shown in the figures. In this example, the frequency axis is denoted as the logical sequence. In a system where OFDM is used as the modulation method of the radio signal transmitted and received between a base station and a terminal, the frequency is a set of elements called subcarriers that are separated by FFT. A major group described above is composed of a collection of multiple subcarriers. A subcarrier is the minimum unit configured on the frequency axis, and one symbol is transmitted by one subcarrier. In the physical sequence, the logical sequence described above is scrambled by a pseudo-random sequence called Perm base. Physically scrambling the logical sequence in this way prevents only a specific subcarrier from being continuously affected by interference between the neighboring base stations. Because the description of the present invention becomes complex if the physical sequence is used, the following describes the embodiments using the logical sequence.

FIGS. 2A and 2B each show the downlink transmission power of each major group between the two stations, base station A (FIG. 2A) and base station B (FIG. 2B). In base station A, major groups 401 and 402 transmit the signal with a high transmission power. Conversely, in base station B, major groups 411 and 412, which represent frequencies corresponding to the major groups 401 and 402, transmit the signal with a low transmission power.

By putting weight on the transmission power in this way between the neighboring base stations, a terminal located at the cell boundary between base station A and base station B and connected to base station A uses the major group 401 or 402 for communication to make it difficult for the terminal to be affected by the major group 411 or 412 of the neighboring base station B. Similarly, a terminal located at the cell boundary between base station A and base station B and connected to base station B uses the major group 415 or 416 for communication to make it difficult for the terminal to be affected by the major group 405 or 406 of the neighboring base station A.

Next, the following describes the outline of interference control between base stations.

FIG. 3 is a diagram showing an example of the sequence between an interfering station and an interfered station.

The interfered station estimates an interfering station (311) from the scan report operation that is performed for the terminals (310). The interfered station transmits an interference notification to the estimated interfering station (312). The interfering station that receives the interference notification checks the interference notifications from multiple neighboring base stations and performs power control for reducing the transmission power.

The transmission power of each major group, determined by the transmission power control, is notified to each neighboring base station via a transmission power notification (314). The neighboring base station, which transmitted the interference notification, uses the value notified by the transmission power notification and the value determined by the scan report operation to decide the resource allocation, especially, the resource allocation of a terminal at the cell boundary, to determine which major group to use to transmit the signal. Conversely, when the interference notification is not received, the power control is performed to increase the transmission power. By performing the power control in this way, the downlink power control can be performed with consideration for the interference state between the base stations.

Next, the following describes the scan report operation.

Figure 4:
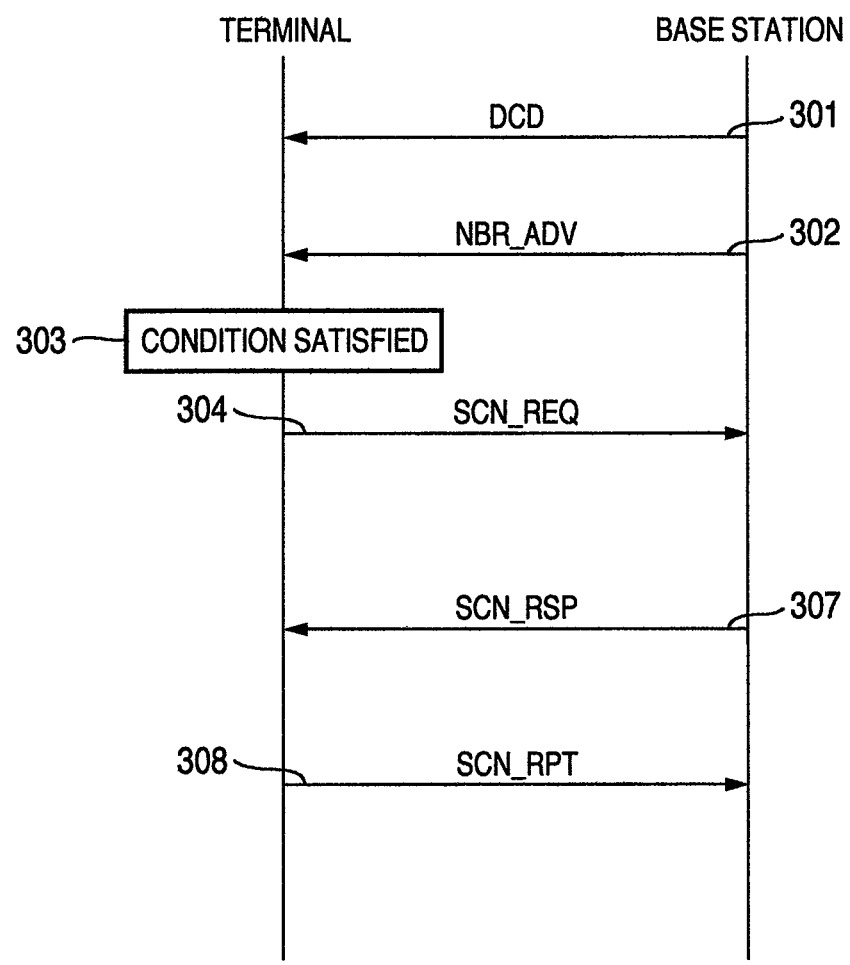
FIG. 4 is a diagram showing the sequence of the scan report operation between a terminal and a base station.

FIG. 4 is a diagram showing the sequence of the scan report operation between a terminal and a base station.

First, the base station transmits an instruction, which specifies the method of the scan report operation, to the terminal via DCD (Downlink Channel Descriptor, downlink channel notification information) message 301. For example, the instruction specifies the measurement frequency of RSSI (Received Signal Strength Indicator, received signal strength) and CINR (Carrier to Interference-plus-Noise Ratio, carrier to interference noise power ratio). The measurement condition for the scan is also specified by DCD 301. As the measurement condition, the comparison method and the threshold for RSSI and CINR, which are measuring results, are specified. The comparison method is, for example, the comparison between RSSI and the threshold or the comparison method for checking if the difference between CINR of the currently connected base station and CINR of a neighboring base station is equal to or smaller than the threshold that is set. The neighboring base stations to be measured are specified by an NBR_ADV (neighbor notification information) message 302. The terminal receives the preamble of a base station specified by the NBR_ADV message and measures RSSI of the neighboring base station and CINR of the preamble. The terminal compares the measurement result with the specified measurement condition (303) and, if the condition is satisfied, transmits SCN_REQ (scan request) 304 to the base station. The base station that receives SCN_REQ transmits SCN_RSP (scan response) 307 to the terminal. The terminal transmits SCN_RSP (scan response) to the terminal to request the terminal to return the report measured for the neighboring base stations. The terminal, which is requested by SCN_RSP to return the report, reports the scan result as requested by the instruction.

Next, the following describes a case in which a base station has a sector configuration.

Figure 5:
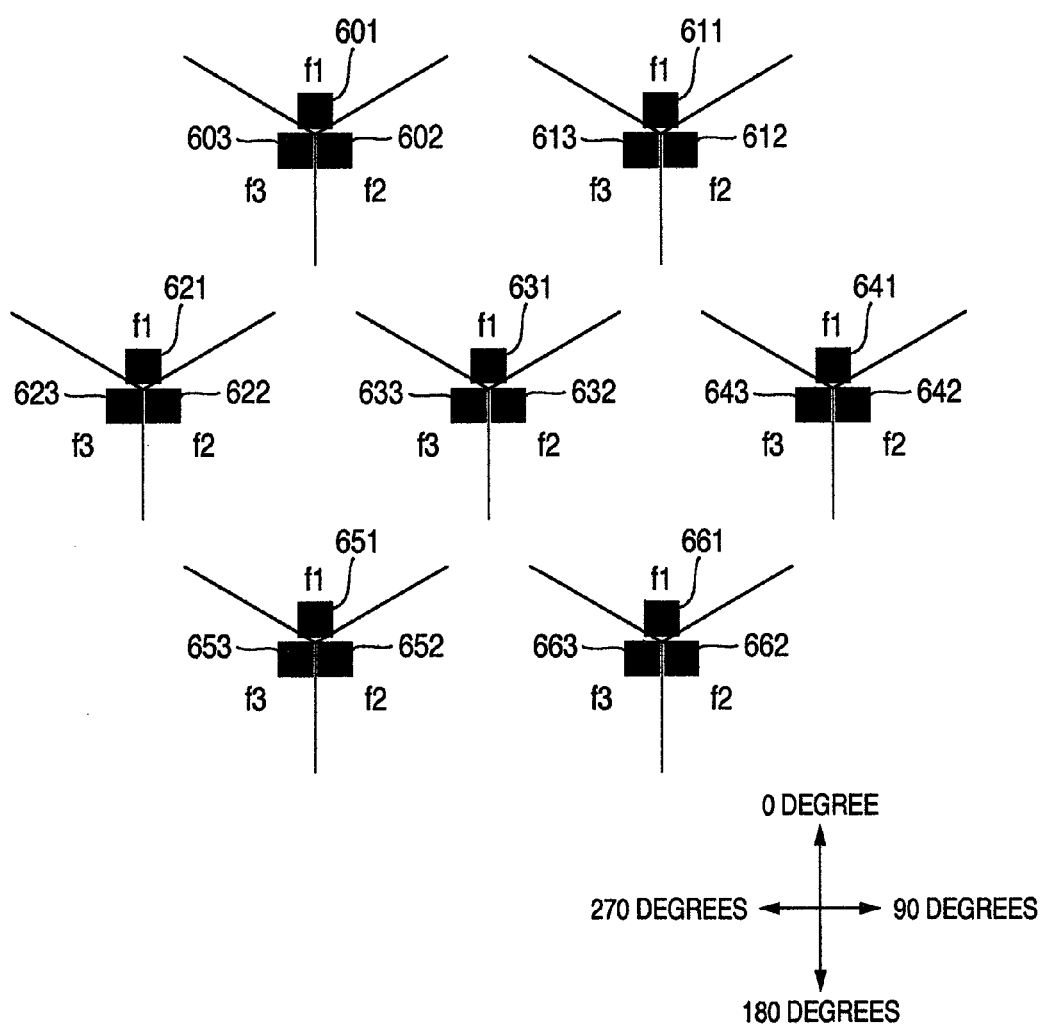
FIG. 5 is a diagram showing an example of a radio communication system with the sector configuration.

FIG. 5 is a diagram showing an example of a radio communication system with the sector configuration.

In FIG. 5, the three base stations (631, 632, 633), which are located in one location, build the sector configuration in which the three neighboring cells are configured by directional sector antennas. The station indicated by the reference numeral 631 is a station that transmits the signal in the 0-degree direction at frequency of f1. The station indicated by the reference numeral 632 is a station that transmits the signal in the 120-degree direction at frequency of f2. The station indicated by the reference numeral 633 is a station that transmits the signal in the 240-degree direction at frequency of f3. In such a radio communication system with the sector configuration, the neighboring base stations use the frequencies different with each other (that is, among sectors). Each of other three base stations (601-663), which are located in one location and build the sector configuration in which the three neighboring cells are configured by directional sector antennas, are also allocated the frequencies f1, f2, and f3 that do not overlap among the neighboring base stations. This frequency allocation is called a frequency reuse. When the frequencies differ, no interference is generated.

The scan described above is performed based on the neighbor information specified by the NBR_ADV (neighbor notification information) message notified from the base station to the terminal. The scan is performed primarily for determining a handover. Therefore, the neighbor information transmitted from the base station to the terminal via the NBR_ADV (neighbor notification information) message includes the information on neighboring base stations to which different frequencies are allocated. No interference is generated among the base stations using different frequencies. Therefore, the base stations for which the scan is necessary to estimate an interfering station are different from those selected for determining a handover. In addition, the time at which the base station requests the terminal to report the scan result must be controlled. Thus, there has been a need for a mechanism for reporting the scan result on appropriate base stations at an appropriate time.

Next, the following describes the neighbor information.

FIG. 6 is a diagram showing an example of the neighbor information.

FIG. 6 shows an example of the neighbor information that is transmitted from the base station 632 to the terminal via the NBR_ADV message in a radio communication system with the sector configuration shown in FIG. 5.

The neighbor information transmitted from the base station 632 to the terminal via the NBR_ADV message describes the base stations 631 and 633, which are co-located with the base station 632, and the surrounding base stations 601-663. The measurement condition for transmitting SCN_REQ is specified in advance for the terminal via the DCD message by the base station 632 to which the terminal is connected. When the specified measurement condition is satisfied, the terminal transmits SCN_REQ. In response to SCN_REQ, the base station transmits SCN_RSP. If SCN_RSP received from the base station specifies that the report be returned, the terminal transmits SCN_RPT to the base station. The terminal receives the signals such as the preambles, transmitted by the base stations described in the neighbor information, measures RSSI and CINR, and reports the measurement result to the base station as necessary.

The present invention focuses on the possibility that SCN_RSP can include the information specifying the base stations to be scanned and an instruction specifying whether the report is required. To request the terminal to return the report to be used for estimating an interfering station, SCN_RSP specifies only the base stations that are likely to generate interference. In addition, the present invention provides a mechanism in which, when SCN_REQ usually transmitted from the terminal to perform a handover is received, the base station does not transmit SCN_RSP in response to each SCN_REQ for requesting the report but, instead, checks if it is the time for estimating an interfering station and, if so, transmits SCN_RSP for requesting the report. The following describes when the report for estimating an interfering station is to be returned and how to limit the base stations to those on which the report is to be returned.

The neighbor information in FIG. 6 describes as many as 20 neighboring base stations. However, only six of those neighboring base stations, indicated by a rectangular, have the same frequency as the base station 632 has. That is, to determine a handover, the base station 632 must transmit the neighbor information, which including all 20 base stations, to the terminal. On the other hand, to estimate an interfering station, the scan operation need be performed only for the six of the base stations. This means that, when the base station requests the terminal to report the scan result to estimate an interfering station, the information on 14 base stations would be sent wastefully if the report is transmitted based on the same neighbor information that is used for a handover.

Figure 7:
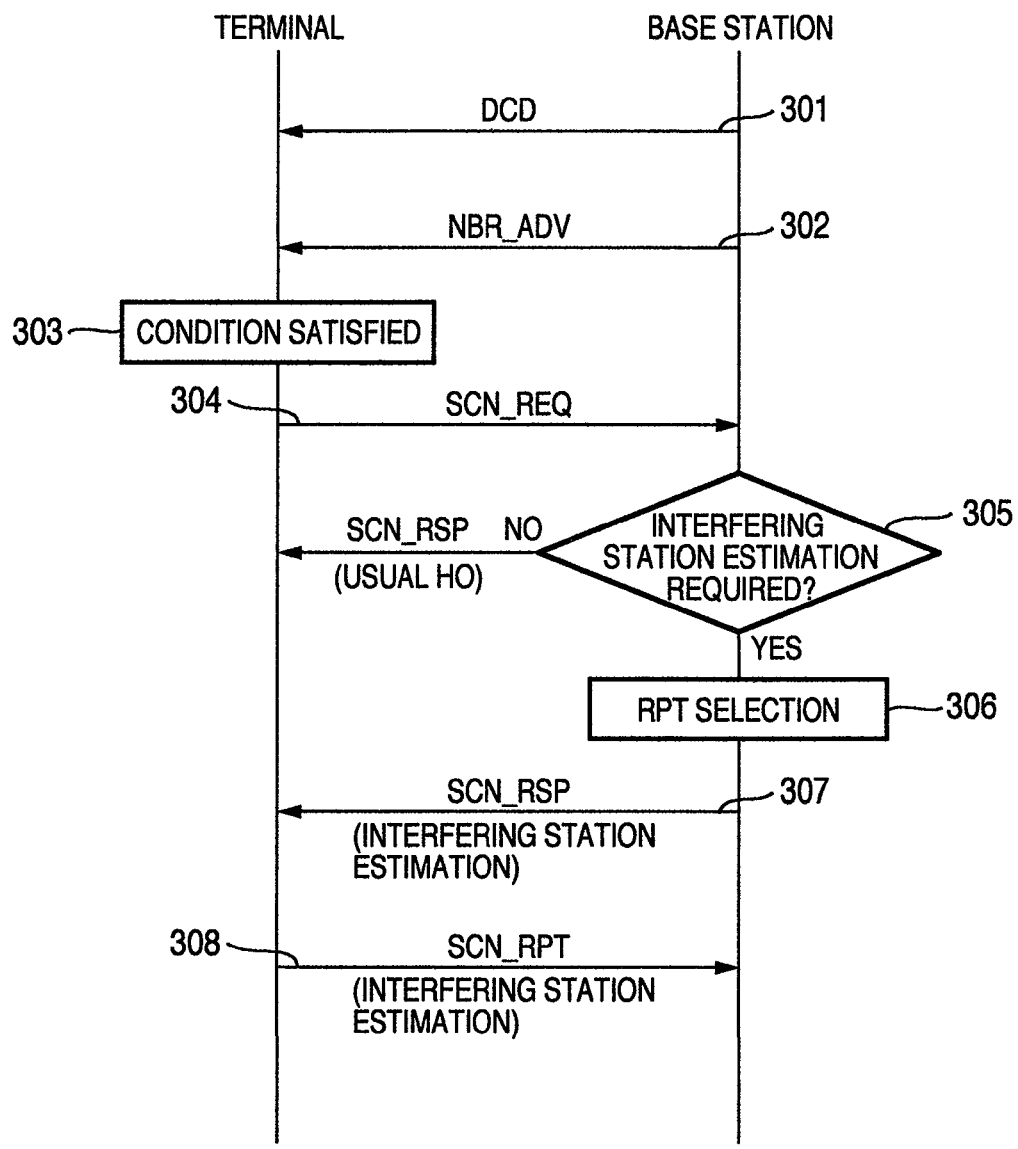
FIG. 7 is a sequence diagram showing the scan report operation in one embodiment of the present invention.

FIG. 7 is a sequence diagram showing the scan report operation in one embodiment of the present invention.

A first difference from FIG. 4, in which the conventional technology is shown, is that this diagram includes a checking step for interfering-station estimation requirement 305 and a RPT selection block 306. A second difference from FIG. 4, in which the conventional technology is shown, is that SCN_RSP is used as one of two types of message, SCN_RSP (response for normal handover) message transmitted to the terminal when interfering station estimation is not required and SCN_RSP (response for interfering station estimation) message transmitted when interfering station estimation is required, and that the contents included in those messages differ. In the RPT selection block, the base station selects only the base stations, which are likely to cause interference to the base station 632 (neighboring base stations to which the same frequency as that of the base station 632 is allocated), from the neighbor information, specifies the selected base stations for SCN_RSP, and requests the terminal to transmit the report. By doing so, when the base station requires the report for estimating an interfering station, the terminal can report only the necessary information to the base station. This method reduces the wasteful consumption of the uplink radio resources.

FIG. 8 is a diagram showing the simulation result of the CINR distribution calculation when three frequencies, f1, f2, and f3, shown in FIG. 5 are reused (reuse rate is 3). The three base stations with the sector configuration are located at a point indicated by a black rectangle in FIG. 8. The scan measurement condition specified by the base station using DCD is set in such a way that the measurement is triggered, for example, when the CINR is equal to 9 dB or lower. A black circle in FIG. 8 is a location where CINR is low, and the terminals around the black circle are constantly performing the scan operation for satisfying the scan measurement condition.

In WiMAX, one of the two system configurations is possible, one is a system where a handover is initiated by the base station and the other is a system where a handover is initiated by the terminal. In the system configuration where a handover is initiated by the terminal, the base station transmits SCN_RSP in response to SCN_REQ transmitted from the terminal to the base station; however, because the terminal determines whether to perform a handover, the base station does not request the terminal to report the scan result.

In the sequence of the scan report operation shown in FIG. 7, the base station checks if it is the time for estimating an interfering station. If so, the base station specifies the information on the base stations, which are likely to generate interference, for SCN_RSP and requests the terminal to return the report. The base station checks if it is the time for estimating an interfering station and, at the same time, specifies the report-requested base stations (base stations selected for report generation) for SCN_RSP because of the following reason. That is, if the base station requests the terminal to generate the report for all base stations included in the neighbor information reported by DCD each time the scan operation is requested and performs an estimation for the base stations that are likely to generate interference, a large amount of information would be exchanged. One method for determining whether it is the time for estimating an interfering station is as follows. That is, when SCN_REQ is received, the base station compares the immediately preceding report time with the current time. If the time difference is equal to or smaller than the threshold, the base station does not request the terminal to return the report. If the time difference is larger than the threshold, the base station determines that it is the time for performing the interfering station estimation processing and, with the report-requested base stations specified for SCN_RSP, transmits interfering-station estimation SCN_RSP to the terminal to request it to return the report. Whether to perform the interfering-station estimation may also be determined based on a condition other than the time difference. For example, the internal timer may be used to achieve the same effect. The amount of wasteful reports is reduced in this way, and the consumption of the uplink resources is reduced by specifying the base stations for which the scan report operation is to be performed.

Figures 9, 10:
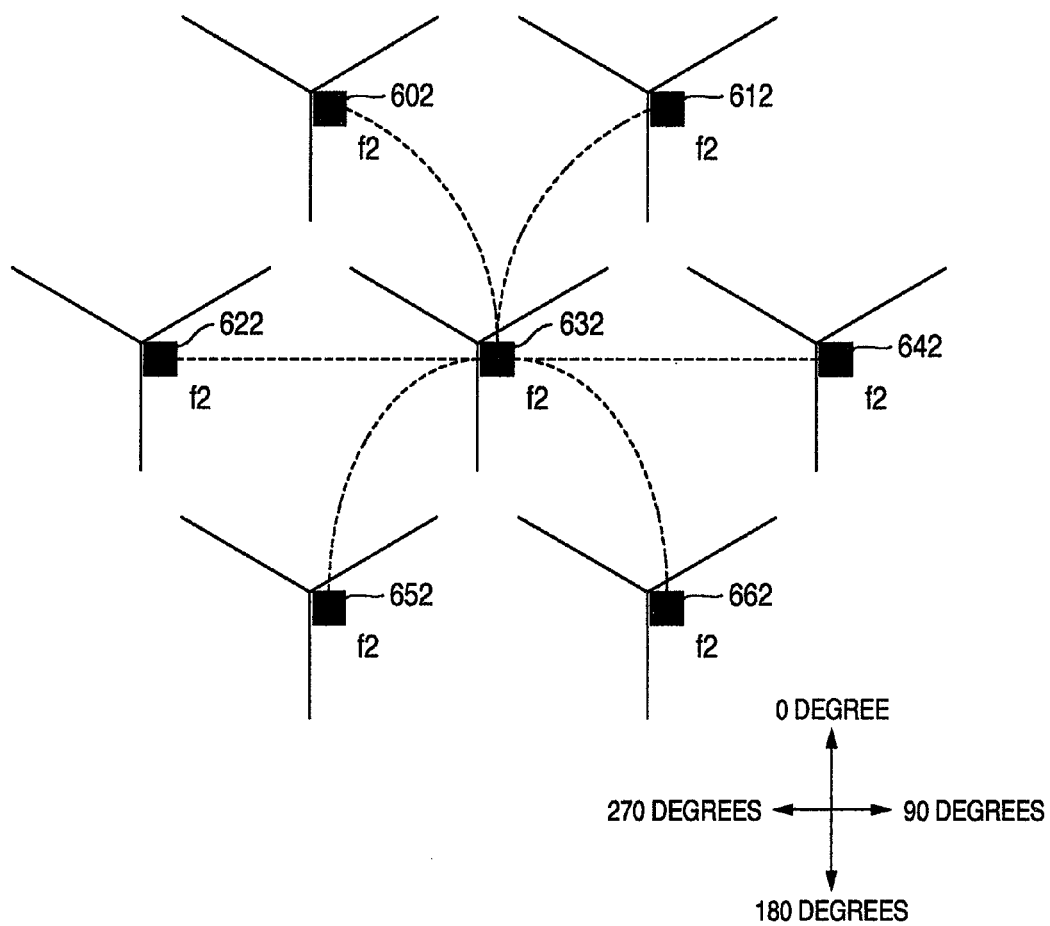
FIG. 9 is a diagram showing the image of cooperation among the base stations in one embodiment of the present invention.
FIG. 10 is a diagram showing an example of neighbor information in one embodiment of the present invention.

FIG. 9 is a diagram showing the state of cooperation among the base stations.

FIG. 9 shows only the base stations that are shown in FIG. 5 and that are likely to cause interference to the base station 632.

The base stations in the radio communication system are connected via a wired network, with each base station being able to communicate directly with its neighboring base stations (even when the base stations cannot communicate directly, they can communicate via a gateway). That is, the base station 632 shown in FIG. 9 can communicate, or share information, with the surrounding base stations 602, 612, 622, 642, 652, and 662 that use the same frequency to transmit signals as the base station 632.

The base station 632 transmits interfering-station estimation SCN_RSP, with the report-requested base stations specified it as described above, to the terminal to request the terminal to return the report, and obtains the report on the base stations 602, 612, 622, 642, 652, and 662, shown in FIG. 9, from the terminal. The base station 632 uses this report to check if the terminal is affected by interference from the base stations 602, 612, 622, 642, 652, and 662. If it is determined as the result of checking that the terminal is affected by interference, the base station 632 transmits an interference notification to a base station that is one of the base stations 602, 612, 622, 642, 652, and 662 and that causes interference to the terminal. The base station that receives the interference notification performs the transmission power control considering the base station 632 and the interference notifications received from multiple base stations. Because there are various transmission-power control methods, the description is omitted here. The transmission power of each major group defined by the transmission power control is notified to the base station 632 and the neighboring base stations via the transmission power notification. When the transmission power notification is received, the base station 632 uses the value notified by the transmission power notification and the value reported by the scan report operation to determine the resource allocation, especially, the resource allocation to a terminal at a cell boundary, so that a terminal at a cell boundary can determine which major group to use to transmit the signal.

FIG. 10 is a diagram showing the neighbor information in one embodiment of the present invention.

FIG. 10 shows the neighbor information generated by selecting only the base stations, which are likely to cause interference to the base station 632, from all neighboring base stations of the base station 632 shown in FIG. 5. In this embodiment, when the base station requests the terminal to transmit the report for estimating an interfering station, the base station notifies the terminal about the neighbor information, which includes the base stations that use the same frequency and that may cause interference, such as the one shown in FIG. 10. Transmitting this neighbor information allows the terminal to transmit the report only on the base stations necessary for estimating an interfering station. If the list shown in FIG. 10 is used for a handover, a handover to neighboring base stations, which use frequencies different from that of the base station, cannot be performed. Therefore, the scan operation is performed for all neighboring base stations shown in FIG. 5 and, based on the scan result, the terminal checks if a handover is required and, if required, transmits a handover request to the base station.

Figure 11:
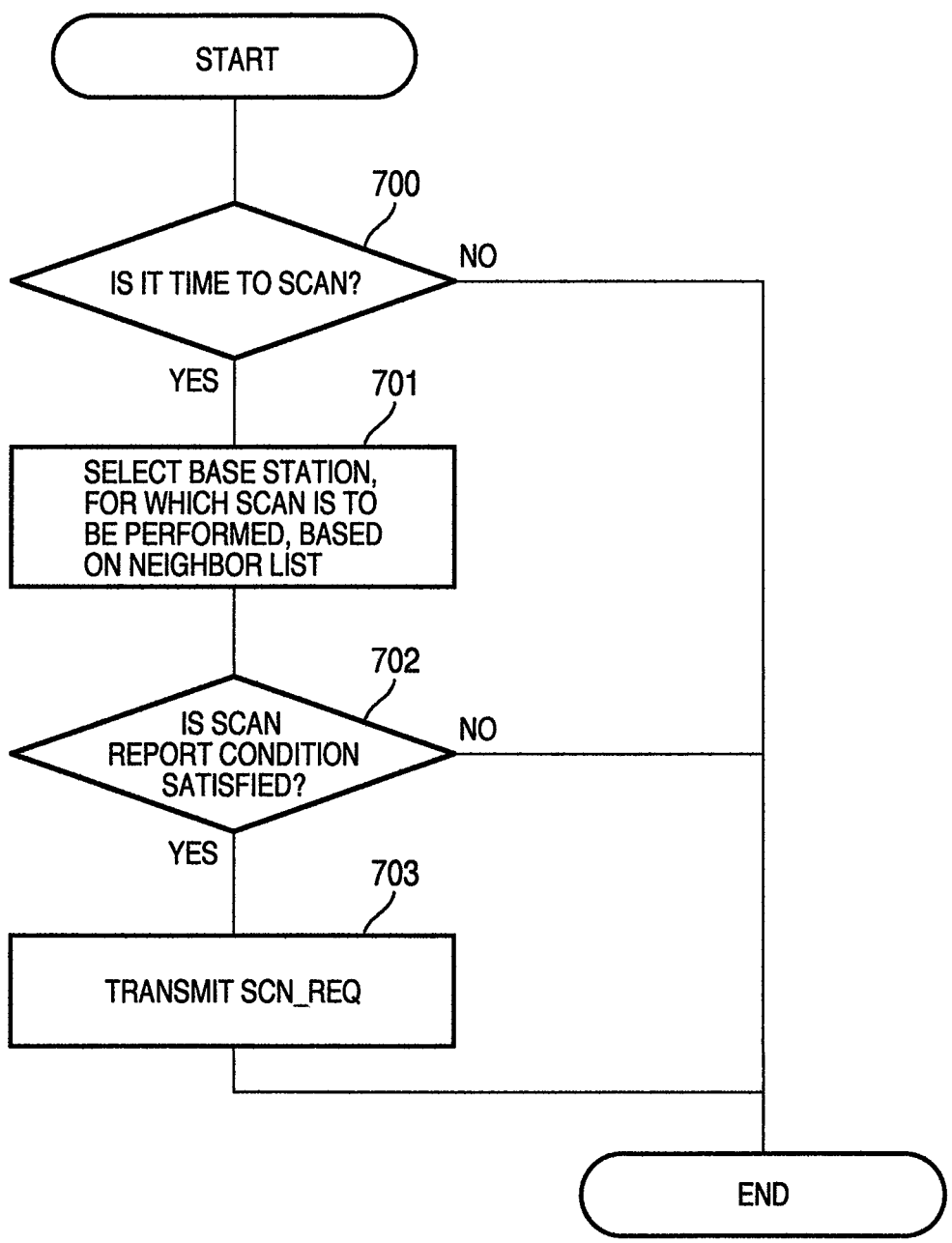
FIG. 11 is a flowchart showing the scan condition determination processing performed by a terminal.

FIG. 11 is a flowchart showing the scan condition determination processing performed by the terminal.

FIG. 11 shows the flow in which the terminal shown in FIG. 4 and FIG. 7 checks if the scan measurement condition is satisfied.

For example, if the base station specifies via DCD that the measurement condition is satisfied when CINR is 9 dB or lower, the terminal determines that it is the time to start the scan operation when the state, in which CINR is equal to or lower than 9 dB, continues for a predetermined time (step 700). Based on the neighbor information notified from the base station via NBR_ADV, the terminal selects the neighboring base stations for which the scan operation is to be performed (step 701) and, if the scan operation is required (step 702), notifies the base station that the scan operation is to be performed for the selected neighboring base stations (step 703). The base station may notify one neighboring base station or multiple neighboring base stations to the terminal as the neighboring base stations for which the scan operation is to be performed.

Figure 12:
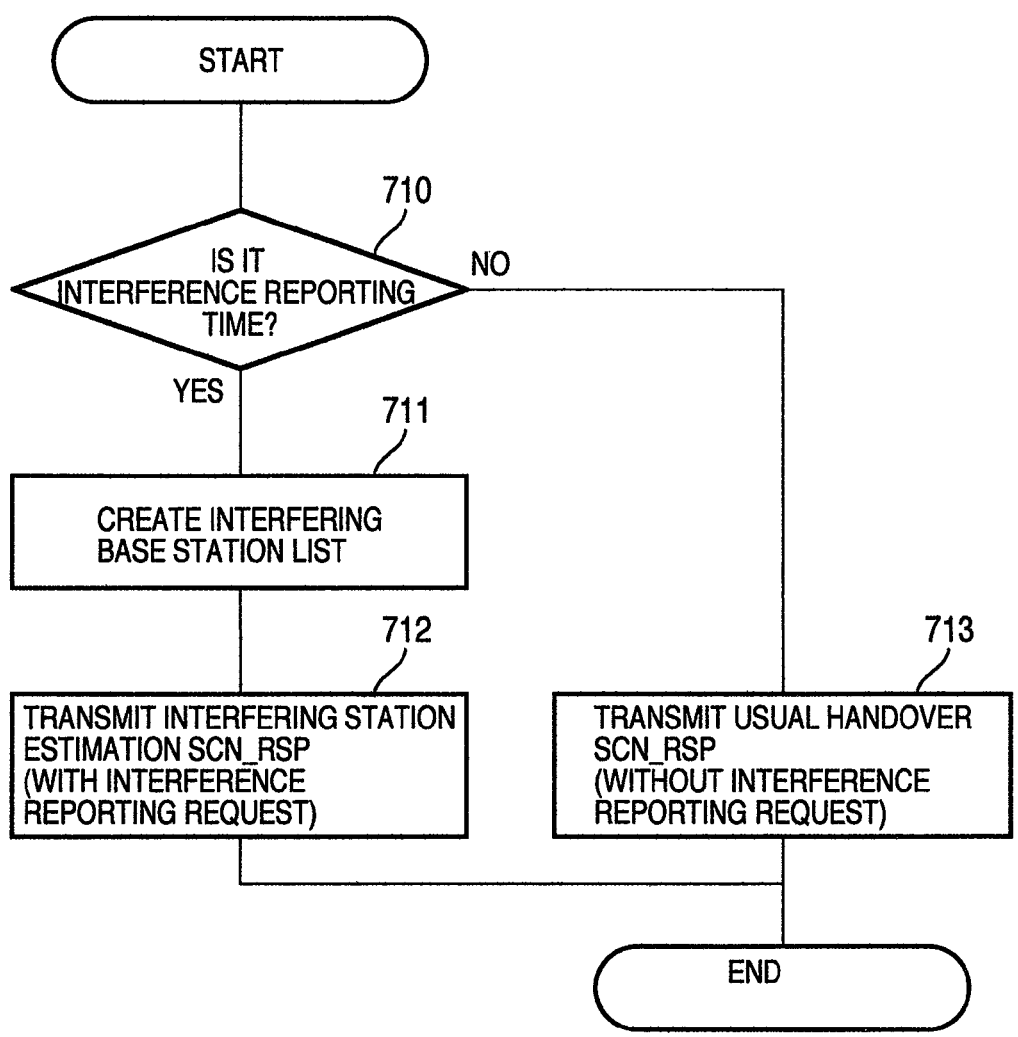
FIG. 12 is a flowchart showing the content of the base station selection processing performed by a base station.

FIG. 12 is a flowchart showing the content of the base station selection processing performed by a base station.

FIG. 12 shows an example of a system in which a handover is initiated by a terminal. When SCN_REQ is received from the terminal, the base station checks if it is the time for the terminal to report on the estimation of an interfering station (step 710) and, if not, transmits the usual handover SCN_RSP (step 713). In the system in which a handover is initiated by a terminal, SCN_RSP transmitted in this step is SCN_RSP that does not request the terminal to transmit a report to the base station.

On the other hand, if it is determined in step 710 that it is the time to report on the estimation of an interfering station, the base station creates a list (neighbor information) including the base stations for which interference reporting is required (step 711) and transmits SCN_RSP, which includes the neighbor information, to the terminal (step 712). Because SCN_RSP transmitted in step 712 is SCN_RSP that requests the terminal to transmit the scan result to estimate an interfering station, a report request is specified for SCN_RSP.

Figure 13:
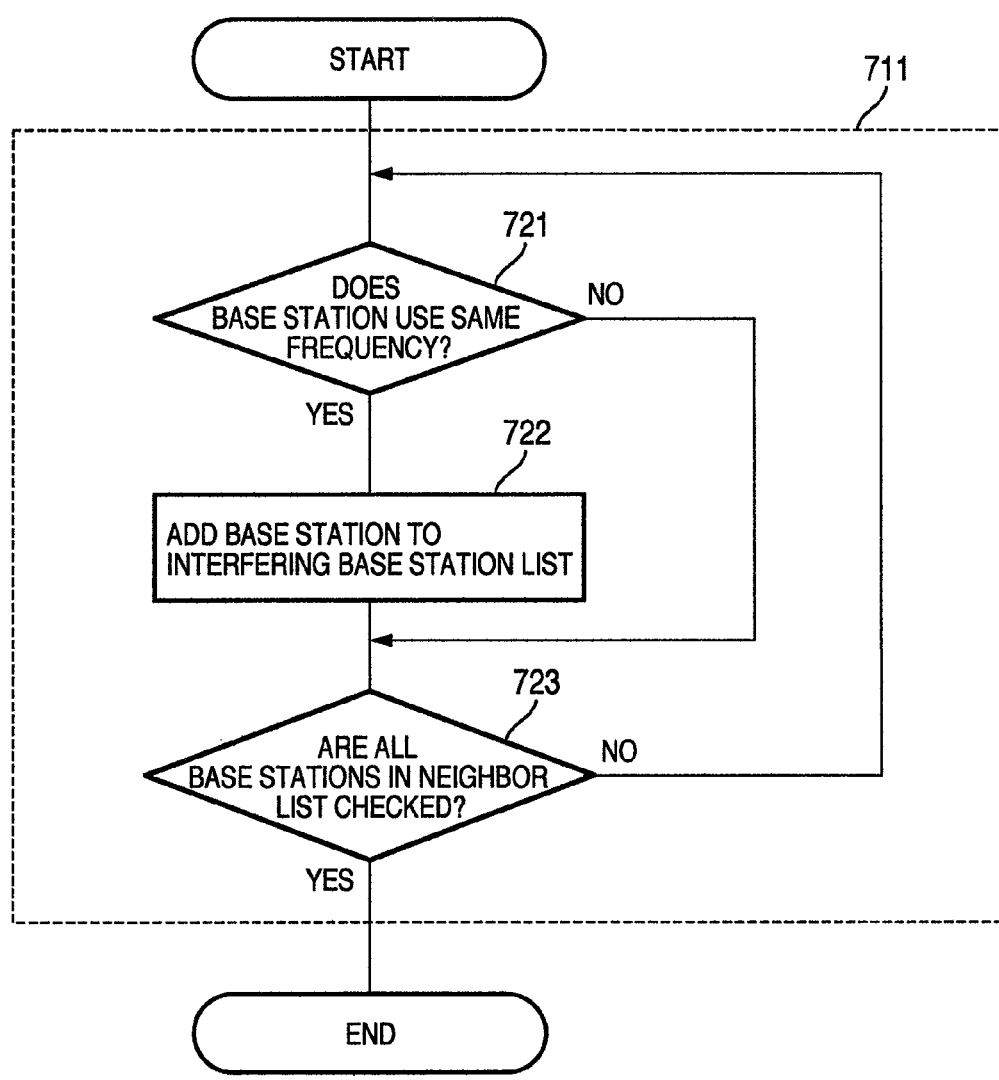
FIG. 13 is a flowchart showing the interfering base station list creation processing performed by a base station.

FIG. 13 is a flowchart showing the interfering base station list creation processing in step 711 in FIG. 12.

The base station checks a base station, included in the neighbor information notified via DCD, if the base station uses the same frequency as the interfered base station uses (step 721) and, if so, adds the base station to the interfering base station list because it is likely to cause interference (step 722). When all base stations included in the neighbor information of the base station are checked, the creation of the interfering base station list is terminated (step 723).

Figure 14:
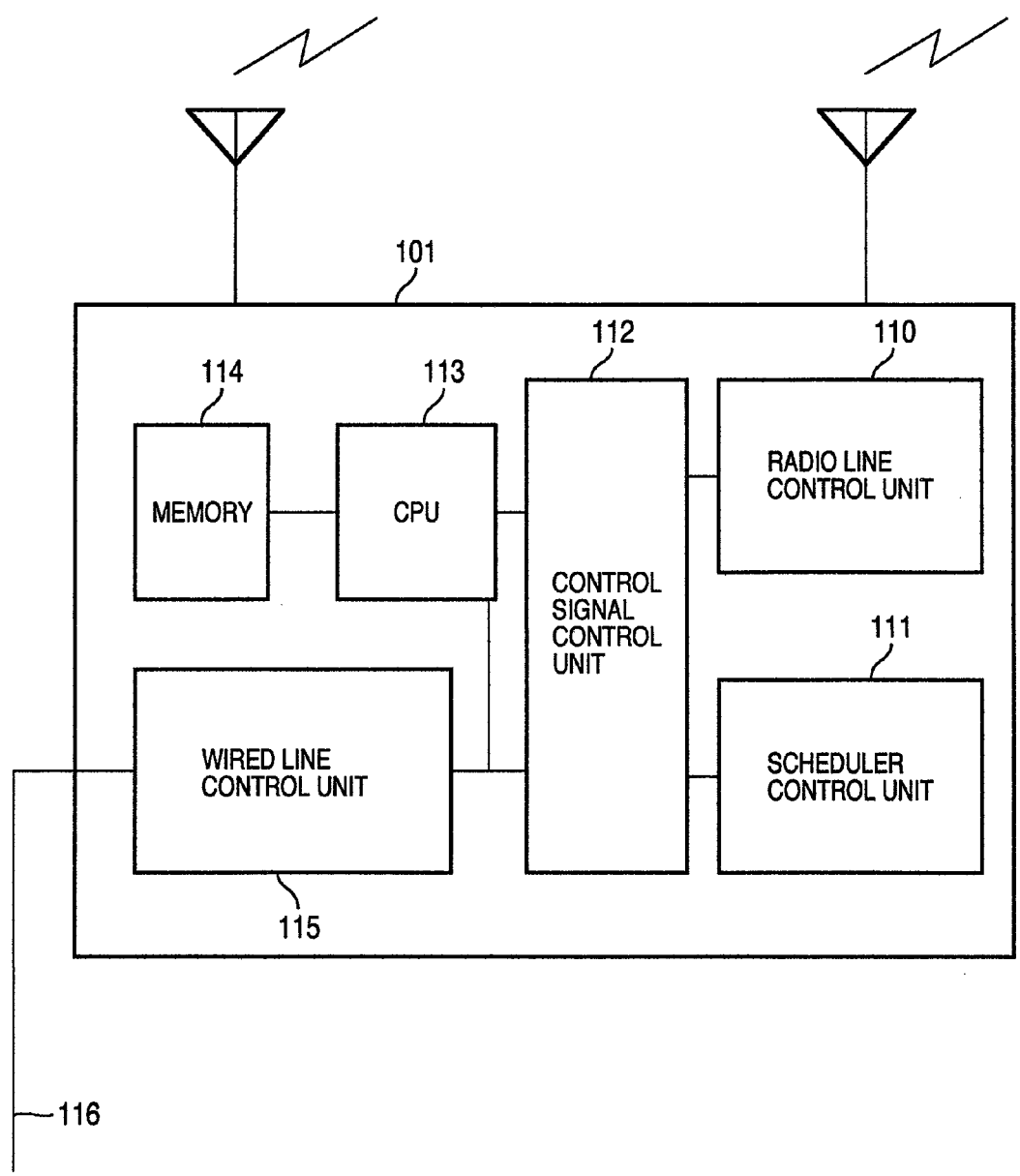
FIG. 14 is a diagram showing the configuration of a base station in one embodiment of the present invention.

FIG. 14 is a diagram showing an example of the configuration of a base station. The base station 101 has multiple transmission/reception antennas. The base station 101 comprises a radio line control unit 110, a scheduler control unit 111, a control signal control unit 112, a CPU 113, a memory 114, and a wired line control unit 115. A network line 116 is connected to the wired line control unit 115. Signaling for exchanging information to and from a terminal or a neighboring base station is generated by the control signal control unit 112 and is transmitted to a terminal at the time specified by the scheduler control unit 111 via the radio line control unit 110 and the antenna. Wired-line-side signaling is transmitted to a neighboring base station via the wired line control unit 115 and the network line 116. The processing of the control units is processed by the CPU 113 with the required data accumulated in the memory 114.

Figure 15:
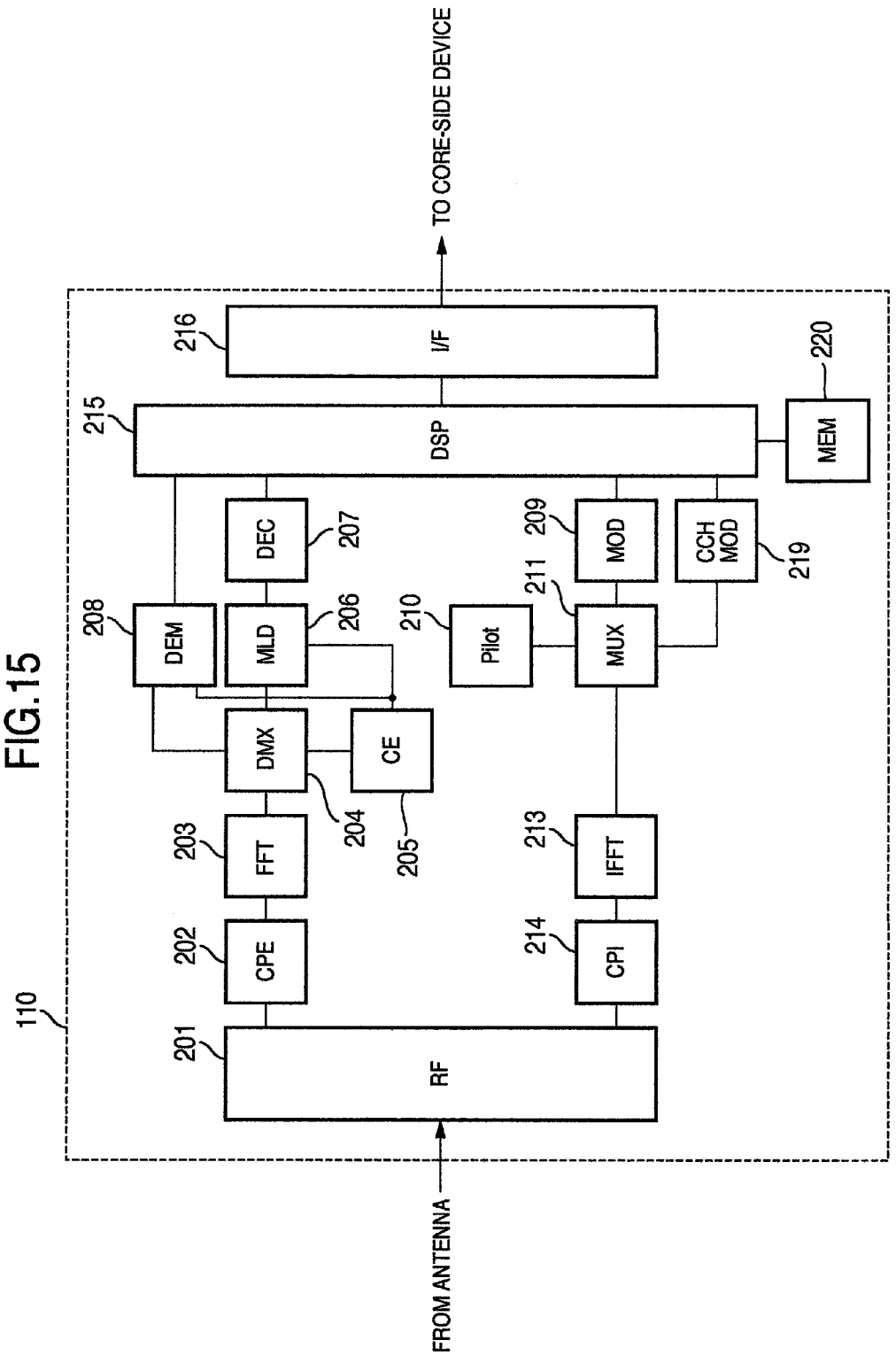
FIG. 15 is a diagram showing the configuration of a radio line control unit in one embodiment of the present invention.

FIG. 15 is a diagram showing an example of the configuration of the radio line control unit 110 of the base station 101.

In this embodiment, the radio line control unit for use with Orthogonal Frequency Division Multiple Access (OFDMA) is shown.

The creation of the signaling for communication with a terminal, one of the features of this embodiment, is performed by a DSP 215. First, the signal received by an antenna, not shown, is input to an RF unit 201 and converted to the digital signal. The signal converted to the digital signal format has the CP removed by a Cyclic Prefix Extraction (CPE) unit 202 at the time dependent on the base station. The CP, an abbreviation for Cyclic Prefix, is added to an OFDM signal to remove the effect of a delayed wave. The CPE unit 202 removes the CP and performs the pre-processing before Fast Fourier Transform (FFT) is performed. An FFT unit 203 performs FFT for the received signal from which the CP is removed. The time domain signal is transformed to the frequency domain signal by the FFT and separated into information on a subcarrier basis. A demultiplexing (DMX) unit 204 identifies the received signal as the information divided by frequency×time, and demultiplexes the signal into channels according to the resource allocation determined by the scheduler implemented in the Digital Signal Processor (DSP) unit 215. The signal is divided primarily into the pilot signal, control signal, and user data signal. The pilot signal (or reference signal) is transmitted to a Channel Estimation (CE) unit 205 for estimating the propagation path.

The control signal is transmitted to a Demodulation (DEM) unit 208 and is demodulated by Minimum Mean Square Error (MMSE) or a similar method using the propagation estimation result calculated by the CE unit 205 for decoding the propagation path coding. The information transmitted from the terminal as the control signal includes ACK/NACK indicating whether the downlink packet transmission is successful, CINR of the base station and RSSI of the reception signal power measured by the terminal, and the reception level of the neighboring base stations used for a handover. The control information generated by the decoding is accumulated in a memory 220 of the DSP unit 215 for use in supporting the scheduler implemented in the DSP unit 215.

The user data signal is transmitted to a Maximum Likelihood detection (MLD) unit 206 where Maximum Likelihood detection (MLD) is performed using the propagation path estimation result calculated by the CE unit 205. The likelihood ratio calculated by the WILD unit 206 is input to a Decoding (DEC) unit 207 where the turbo decoding processing is performed by the DEC unit 207. The obtained information is input to the DSP unit 215 where the layer 2 processing is performed and, via a network interface 216, transmitted to a core-side device not shown.

Information transmitted from the core-side device is recorded in the memory 220 via the network interface 216, the appropriate resources are allocated to the information by the scheduler implemented in the DSP unit 215 and, based on the result, and the information is modulated and transmitted via the antenna. The user data information received in the memory 220 is retrieved by an instruction from the scheduler and, for the retrieved information, the encoding processing, such as turbo coding and interleaving, and the modulation processing, such as Quadrature Phase Shift Keying (QPSK) coding, are performed by a MOD unit 209. The modulated information is allocated to the scheduler-instructed resources by a Multiplexing unit (MUX) 211. At this time, the pilot generated by a pilot generation unit 210 and the control channels created by a control channel modulation unit 219 are allocated together. The transmission power of each major group is set to the transmission power defined by the DSP. The information transmitted via the control channel is created by the DSP unit 215 and is modulated by the control channel modulation unit (CCH(Control channel) MOD) 219. The transmission information multiplexed by the MUX 211 is converted to the time domain information by an IFFT unit 213. The transmission information, to which the CP is added by a CPI unit 214, is input to the RF unit 201. The transmission information is converted from the digital signal to the high-frequency signal, and then amplified, by the RF unit 201 and is output to the antenna not shown.

[Second Embodiment]

Next, another embodiment will be described with reference to FIG. 16 to FIG. 18.

Figures 16, 17:
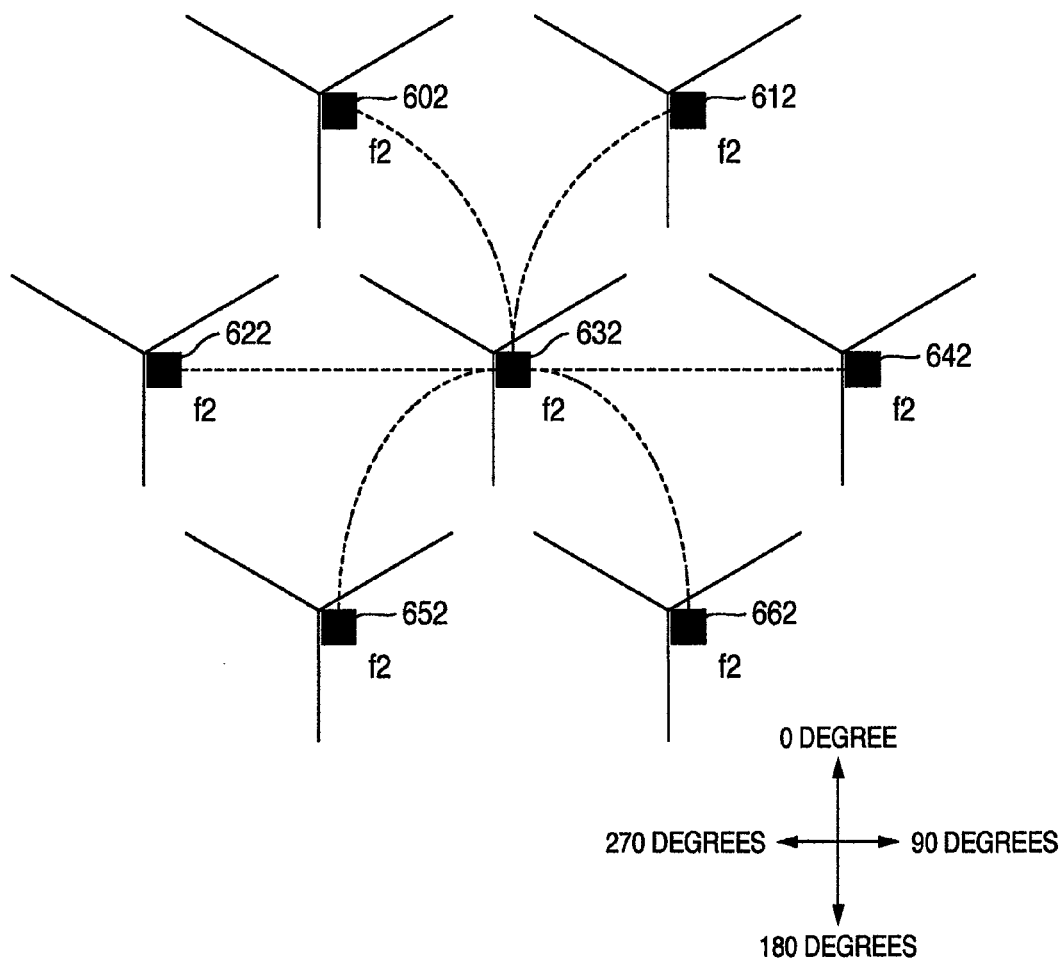
FIG. 16 is a diagram showing the image of cooperation among base stations in one embodiment of the present invention.
FIG. 17 is a diagram showing an example of neighbor information in one embodiment of the present invention.

FIG. 16 is a diagram showing the cooperation among base stations in another embodiment of the present invention.

The second embodiment shows that a terminal 670 is between the neighboring base stations. The terminal 670 is connected to a base station 632.

In such a case, when a report is received from the terminal, the state of the reception signal strength of the terminal 670 is as shown in FIG. 17 as described in the first embodiment. The reception signal from the neighboring base stations 642 and 662, which are near to the terminal 670, is strong while the reception signal from the neighboring base stations 602, 622, and 652, which are distant from the terminal 670, is weak. Based on this result, the base station 632 not only creates an interfering base station list of the base stations that use the same frequency but also sets priority on the entries of the interfering base station list, thus reducing the uplink radio resource consumption as compared to that in the first embodiment.

Figure 18:
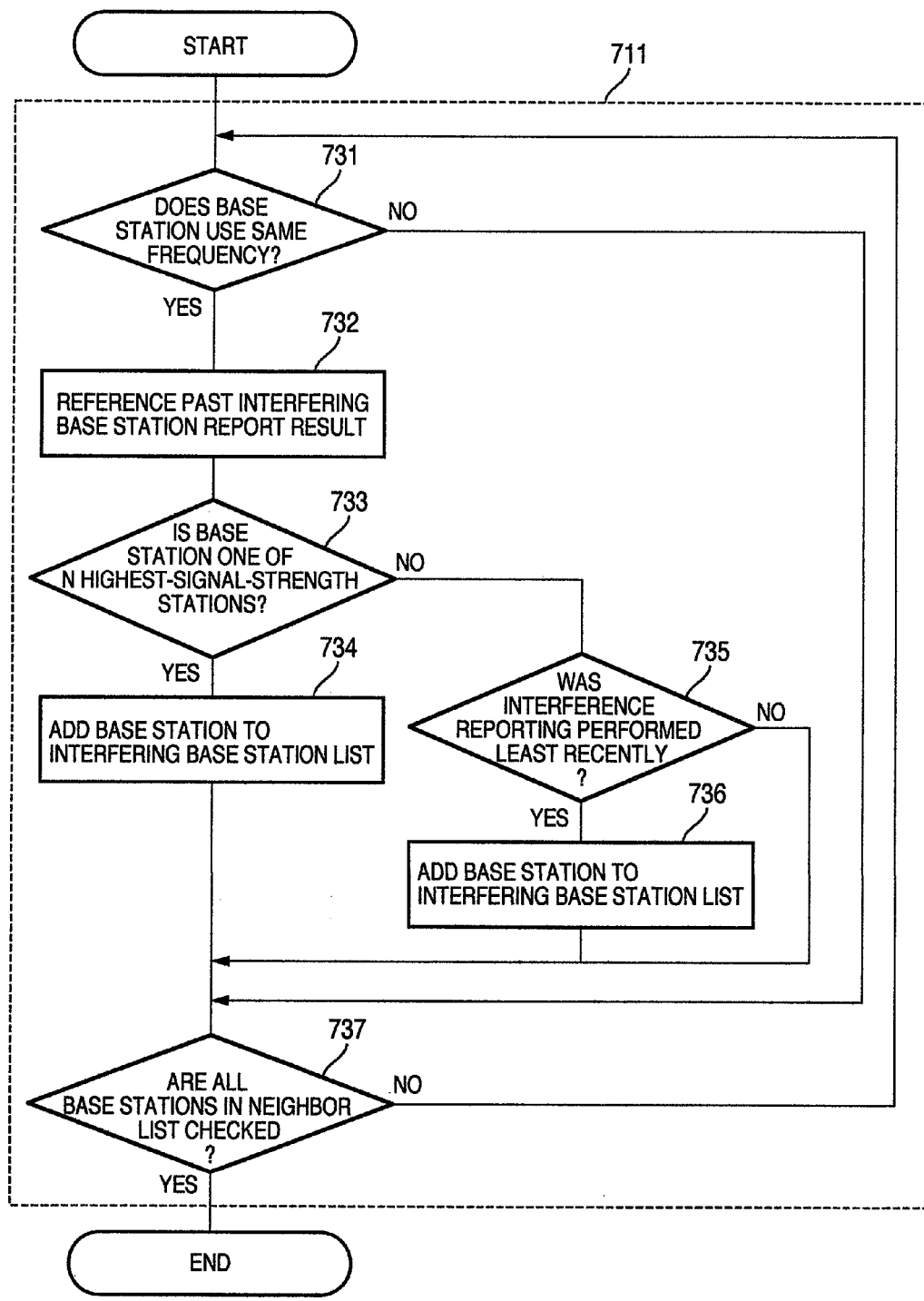
FIG. 18 shows a flowchart showing the interfering base station list creation processing performed by a base station.

FIG. 18 shows the method for setting priority on the entries of the interfering base station list disclosed in the second embodiment. FIG. 18 shows the part of step 711 of the operation sequence diagram in FIG. 12 described in the first embodiment. When SCN_REQ is received from a terminal, the base station checks if a neighboring base station described in the neighbor information uses the same frequency as the base station uses as in FIG. 13 (731) and selects only the neighboring base station, which uses the same frequency, as a candidate for registering in the interfering base station list. For a neighboring base station that uses the same frequency, the base station references the past interfering report result (732) and adds the neighboring base stations to the interfering base station list in descending order of the reception signal strength (733, 734).

For a neighboring base station from which a weak signal is received but for which interference reporting has not been performed for a predetermined period, the base station adds the neighboring base station, for which interference reporting was performed least recently (735), to the interfering base station list (736).

By causing the terminal to perform interference reporting with the use of the interfering base station list as created above, a determination error, which may be introduced by a temporary reduction in the reception signal, can be prevented more efficiently than in the first embodiment while reducing the uplink radio resource consumption.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system comprising:
a plurality of mobile terminals; and
a plurality of base stations each of which communicates wirelessly with said plurality of mobile terminals, each of said plurality of base stations connected to a core-side device via a wired line, wherein:
said plurality of base stations are capable of communicating with each other via the wired line,
based on a measurement condition and neighbor information specified by a base station to which each of said mobile terminals is connected, said mobile terminal measures a reception quality of neighboring base stations included in the neighbor information and, if a transmission request is received from the base station to which the mobile terminal is connected, transmits a measurement result to the base station to which the mobile terminal is connected, when it is a predetermined time to measure interference from neighboring base stations, the base station transmits neighbor information, specifying neighboring base stations which are included in the neighbor information and for which interference measurement is to be performed, and a measurement result transmission request to the mobile terminal, and the mobile terminal transmits a reception quality measurement result of the neighboring base stations, which are specified by said base station and for which interference measurement is to be performed, to said base station.

2. The radio communication system according to claim 1, wherein the base station sets priority on the base stations included in the neighbor information that specifies the neighboring base stations for which interference measurement is to be performed, and the mobile terminal transmits a reception quality measurement result on high-priority neighboring base stations to the base station.

3. The radio communication system according to claim 1, wherein the base station, which receives from the mobile terminal the reception quality measurement result of the neighboring base stations for which interference measurement is to be performed, estimates an interfering neighboring base station based on the measurement result and transmits an interference notification to the neighboring base station, which is estimated to cause interference, via the wired line.

4. A base station that carries out communication wirelessly with a mobile terminal, said base station at least comprising: a radio line control unit that controls a radio signal transmitted to and received from said mobile terminal; a wired line control device connected to a device on a core network via a wired line; an antenna; a storage unit; and a processor unit, wherein said radio line control unit: transmits in advance a message about a measurement condition and neighbor information to the mobile terminal, the measurement condition used to measure a reception quality of neighboring base stations, the neighbor information being information on neighboring base stations for which measurement is to be performed, transmits neighbor information, specifying neighboring base stations which are included in the neighbor information and for which interference measurement is to be performed, and a measurement result transmission request to the mobile terminal if a time when a reception quality measurement request is received from the mobile terminal is a predetermined interference measurement time of the neighboring base stations and stores in said storage unit a reception quality measurement result of the neighboring base stations for which interference measurement is to be performed, the reception quality measurement result received from the mobile terminal.

5. The base station according to claim 4, wherein said base station sets priority on the base stations included in the neighbor information that specifies the neighboring base stations for which interference measurement is to be performed, and requests the mobile terminal to transmit a reception quality measurement result on high-priority neighboring base stations to the base station.

6. The base station according to claim 4, wherein based on the reception quality measurement result of the neighboring base stations for which interference measurement is to be performed, said base station estimates an interfering neighboring base station and transmits an interference notification to the neighboring base station, which is estimated to cause interference, via the wired line, the reception quality measurement result stored in said storage unit.

7. A transmission method of a reception quality measurement result for use in a radio communication system comprising a plurality of mobile terminals; and a plurality of base stations each of which communicates wirelessly with said plurality of mobile terminals, each of said plurality of base stations connected to a core-side device via a wired line, wherein: said plurality of base stations are capable of communicating with each other via the wired line, and based on a measurement condition and neighbor information specified by a base station to which each of said mobile terminals is connected, the mobile terminal measures a reception quality of neighboring base stations included in the neighbor information and, if a transmission request is received from the base station to which the mobile terminal is connected, transmits a measurement result to the base station to which the mobile terminal is connected, said transmission method of a reception quality measurement result comprising the steps of: when it is a predetermined time to measure interference from neighboring base stations, transmitting, by said base station, neighbor information, specifying neighboring base stations which are included in the neighbor information and for which interference measurement is to be performed, and a measurement result transmission request to the mobile terminal, and transmitting, by said mobile terminal, a reception quality measurement result of the neighboring base stations, which are specified by said base station and for which interference measurement is to be performed, to said base station.

8. The transmission method according to claim 7, further comprising the steps of:

setting priority on the base stations included in the neighbor information that specifies the neighboring base stations for which interference measurement is to be performed and transmitting, by said mobile terminal, a reception quality measurement result on high-priority neighboring base stations to the base station.

9. The transmission method according to claim 7, further comprising the step of: estimating, by a base station that receives a reception quality measurement result of neighboring base stations, for which interference measurement is to be performed, from the mobile terminal an interfering neighboring base station based on the measurement result, and transmitting an interference notification to the neighboring base station, which is estimated to cause interference, via the wired line.

* * * * *